United States Patent
Fujimoto et al.

(10) Patent No.: US 8,464,282 B2
(45) Date of Patent: Jun. 11, 2013

(54) OPTICAL DISC APPARATUS WITH MECHANICAL CHASSIS HAVING A RECESS

(75) Inventors: Takayuki Fujimoto, Tsuchiura (JP); Makoto Ibe, Hitachinaka (JP); Seiji Hamaie, Kawasaki (JP); Nozomu Harada, Kawasaki (JP); Shinya Asano, Tokyo (JP); Yoshiaki Yamauchi, Omitama (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 116 days.

(21) Appl. No.: 12/805,839

(22) Filed: Aug. 20, 2010

(65) Prior Publication Data

US 2011/0055856 A1 Mar. 3, 2011

(30) Foreign Application Priority Data

Aug. 31, 2009 (JP) ................. 2009-199197

(51) Int. Cl.
*G11B 33/14* (2006.01)
*G11B 33/12* (2006.01)

(52) U.S. Cl.
USPC ............................. 720/648; 720/603; 720/652

(58) Field of Classification Search
USPC ................. 720/600, 601, 603, 648, 649, 672, 720/674–680, 652
See application file for complete search history.

(56) References Cited

U.S. PATENT DOCUMENTS 6,229,781 B1 * 5/2001 Fujisawa ...................... 720/603

FOREIGN PATENT DOCUMENTS

JP 11-025667 1/1999

* cited by examiner

*Primary Examiner* — Craig A. Renner
*Assistant Examiner* — Gustavo Polo
(74) *Attorney, Agent, or Firm* — Antonelli, Terry, Stout & Kraus, LLP.

(57) ABSTRACT

An optical disc apparatus, presenting recording quality without degradation by an extreme temperature rise in an objective-lens drive mechanism in an optical pickup, includes a mechanical chassis on which a disc rotation mechanism, an optical pickup, and a transfer mechanism are mounted, a decorative plate that is a plate-shaped member located between the disc and the optical pickup and fixed on the mechanical chassis, a disc tray for loading and removing the disc, a circuit board for operation control, and an apparatus housing containing the components. A recess is formed in an indented shape in a portion of the mechanical chassis facing an outer peripheral region of the disc recording surface. An incline is formed in a position close to an opening of the disc tray for mounting the mechanical chassis and opposite the outer peripheral region of the disc recording surface, and slopes gently down to the recess.

6 Claims, 13 Drawing Sheets

CROSS SECTION F-F

OPTICAL DISC APPARATUS WITH MECHANICAL CHASSIS HAVING A RECESS

BACKGROUND OF THE INVENTION (1) Field of the Invention

This invention relates to an optical disc apparatus which records/reproduce information to/from a rotating circular-plate-shaped disc.

(2) Description of the Related Art

An optical disc apparatus refers to a data storage device which rotates a circular-plate-shaped disc which is a data recording medium, and then records data to the disc surface as well as reproduces data recorded on the disc surface.

An electronic component (optical head) includes a laser emitting unit, a laser receiving unit, an objective lens which focuses a laser beam onto a disc surface, and the like, to be used as a signal writing/reading unit for recording/reproducing data. The electronic component is called an optical pickup or simply a pickup. Examples of discs serving as a data recording medium include CD-ROM (Compact Disc Read Only Memory), CD-R (Compact Disc Recordable), CD-RW (Compact Disc Rewritable), DVD-ROM (Digital Versatile Disc Read Only Memory), DVD-R (Digital Versatile Disc Recordable), DVD-RW (Digital Versatile Disc Rewritable), DVD-RAM (Digital Versatile Disc Random Access Memory), DVD+R (Digital Versatile Disc Recordable), DVD+RW (Digital Versatile Disc Rewritable), BD-ROM (Blue-ray (trademark) Disc Read Only Memory), BD-R (Blue-ray (trademark) Disc Recordable), BD-RE (Blue-ray (trademark) Disc Rewritable) and the like. In general, the optical disc apparatus is installed in electronic equipment including a CPU (Central Processing Unit) which performs access control to the optical disc apparatus, operation processing and the like, such as, for example, a PC (Personal Computer).

When the electronic equipment is a desktop PC, the optical disc apparatus used is of the generally so-called half-height type. When the electronic equipment is a notebook PC, the optical disc apparatus used is of the generally so-called slim type.

In the optical disc apparatus, in particular, a larger data storage capacity has been recently required. To achieve the increase in storage capacity, it is necessary to use a large capacity disc such as BD and also to increase the number of disc recording layers such as double layer structure.

That is, for supporting all types of data recording media such as CD/DVD and BD, an optical disc apparatus needs to include a BD-dedicated lens in addition to a CD/DVD-dedicated lens, as an objective lens which is mounted on a position of an optical pickup close to and opposite to the disc recording surface, in order to focus both the CD/DVD red laser light and the BD blue laser light onto the disc recording surface.

In this connection, the objective lens is controlled in its position and its angle relative to the disk recording surface while the disc is rotated. For this purpose, in general, the object lens is secured to a supporting member which is held in the air by a flexible material such as a metal wire. A copper wire is wound around the supporting member so as to form a coil, and also two pairs of permanent magnets are placed on opposite sides of the supporting member. As a result, the supporting member is located in a magnetic field, so that an electromagnetic force is produced by the passage of electric current through the copper wire wound in a coil form in order to control the position and the angle of the supporting member. A mechanism for controlling a position and an angle of an objective lens is herein referred to as an "objective-lens drive mechanism".

As described above, an increase in storage capacity involves the necessity for providing two objective lenses for CD/DVD and BD. This increases the own weight of the supporting member, causing an increase in the amount of current passing through the coil for driving the supporting member increased in own weight, which in turn increase the amount of heat dissipated from the coil. Thus, a temperature rise occurs in the objective lens fitted in the supporting member, and the thermal deformation of the lens causes the deviation of the optical axis of the laser light, resulting in a significant reduction in recording quality.

In terms of cost reduction, plastic is more preferable to glass for a material for the objective lens. In this case, the thermal deformation of the lens is more noticeable, leading to a further apparent reduction in recording quality caused by the deviation of the optical axis of the laser light. In particular, the slim-type optical disc apparatus has a smaller-volume, higher-dense apparatus housing than that of the half-height-type optical disc apparatus. For this reason, the objective-lens drive mechanism equipped with an objective lens is exposed to a higher-temperature atmosphere as compared with that of the half-height-type optical disc apparatus.

SUMMARY OF THE INVENTION

As measures to dissipate heat of an optical pickup, for example, JP-A No. 11-25667 proposes a method of providing an air flow passage in a plate-shaped member interposed between an optical pickup and a disc to direct an air flow produced by disc rotations toward the optical pickup. However, in this method, effective dissipation of the heat of the objective-lens drive mechanism is impossible.

The present invention has been made in view of the above circumstances and provides an optical disc apparatus which has recording quality prevented from being degraded by an extreme temperature rise in an objective-lens drive mechanism installed in an optical pickup even when it is a slim-type optical disc apparatus.

Accordingly, an optical disc apparatus provided by the present invention includes an objective lens focusing laser light emitted from a laser emitting unit onto a recording surface of a disc, an optical pickup including a drive mechanism for driving the objective lens, a transfer mechanism moving the optical pickup in a radial direction of the disc, a mechanical chassis mounted with the transfer mechanism, a decorative plate that is a plate-shaped member located between the disc and the optical pickup and fixed on the mechanical chassis, a disc tray ejected for loading and removal of the disc, and an apparatus housing containing the components. In the optical disc apparatus, the mechanical chassis includes a recess formed in an indented shape in a portion of the mechanical chassis facing an outer peripheral region of the recording surface of the disc. The disc tray includes an incline formed in a position close to an opening of the disc tray drilled for mounting the mechanical chassis and opposite the outer peripheral region of the recording surface of the disc. The incline extends to the recess.

Preferably, the recess has a length decreasing gradually in a rotation direction of the disc.

Preferably, a plurality of the recesses is provided.

According to the present invention, an air flow generated with disc rotations facilitates effective dissipation of heat from an objective-lens drive mechanism. As a result, an optical disk apparatus with recording quality prevented from being degraded by an extreme temperature rise in the objective lens can be provided.

BRIEF DESCRIPTION OF THE DRAWINGS

Embodiments of the present invention will be described in detail with reference to the following drawings, wherein.

DETAILED DESCRIPTION OF THE INVENTION

One embodiment according to the present invention will be described below with reference to FIG. 1 to FIG. 11.

First Embodiment

Figure 1:
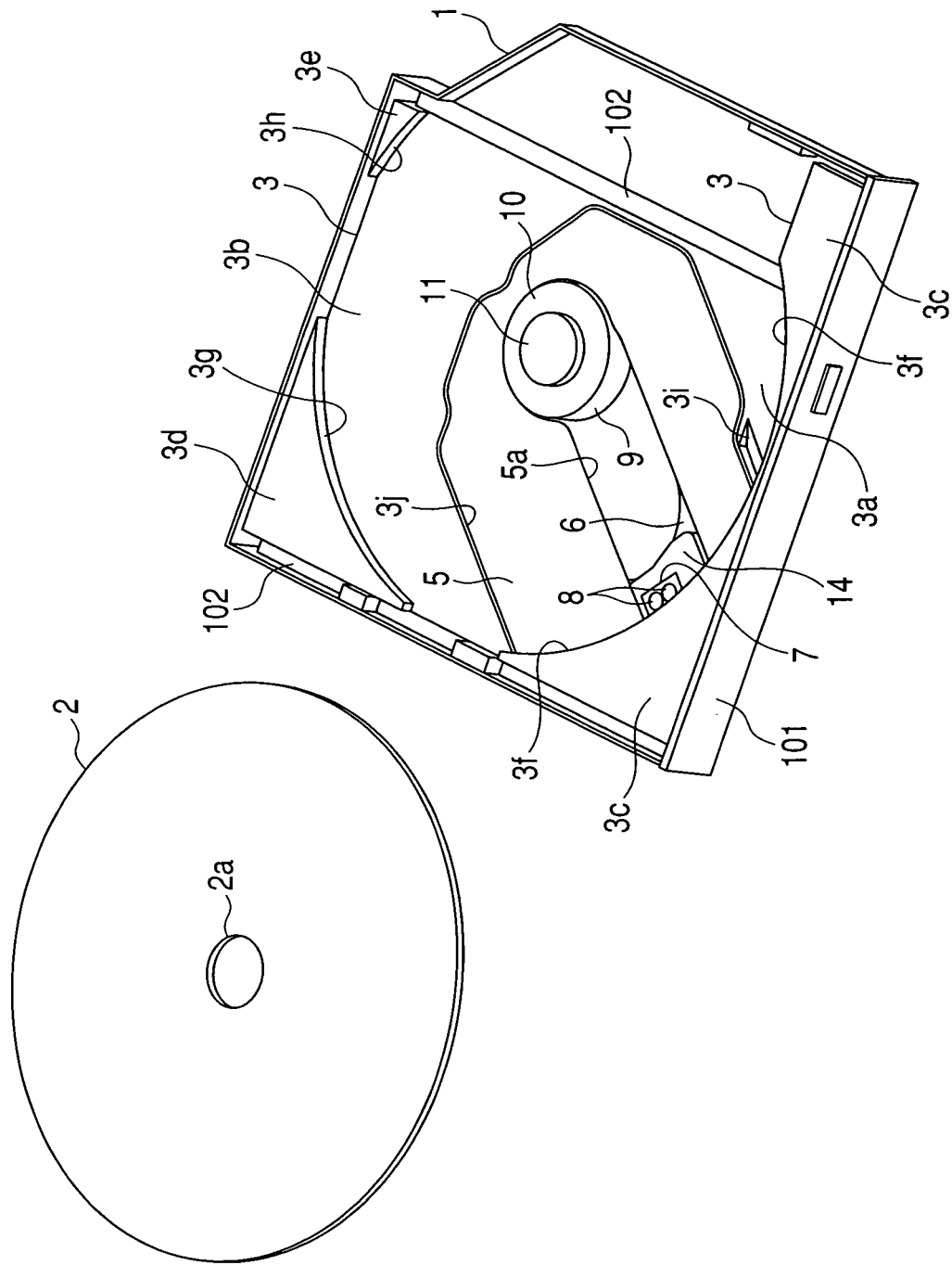
FIG. 1 is a perspective view schematically illustrating the internal structure of an optical disc apparatus according to a first embodiment of the present invention.

FIG. 1 is a perspective view schematically illustrating the internal structure of an optical disc apparatus according to a first embodiment.

Figure 2:
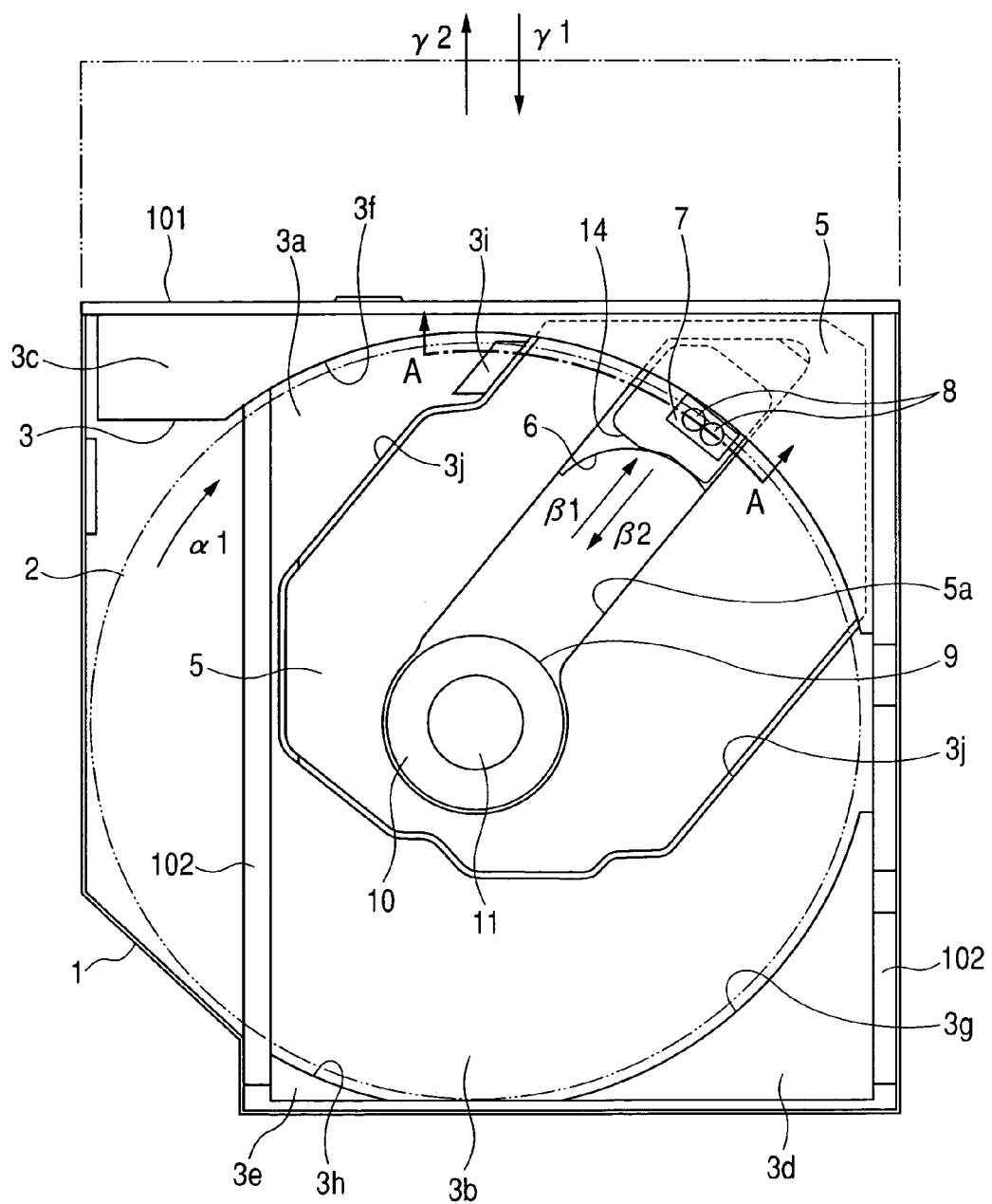
FIG. 2 is a plan view schematically illustrating the internal structure of the optical disc apparatus according to the first embodiment.

FIG. 2 is a plan view schematically illustrating the internal structure of the optical disc apparatus according to the first embodiment.

Figure 3:
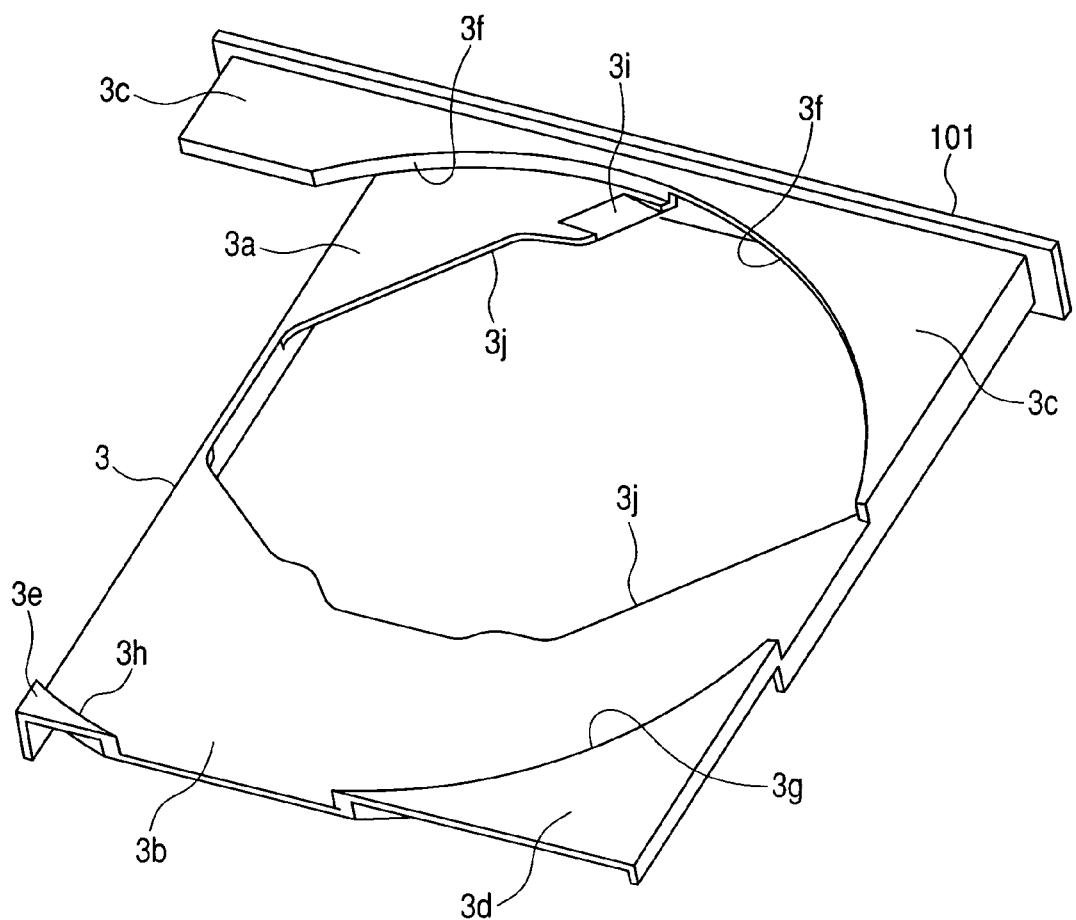
FIG. 3 is a perspective view of a disc tray mounted in the optical disc apparatus according to the first embodiment.

FIG. 3 is a perspective view of a disc tray mounted in the optical disc apparatus according to the first embodiment.

Figure 4:
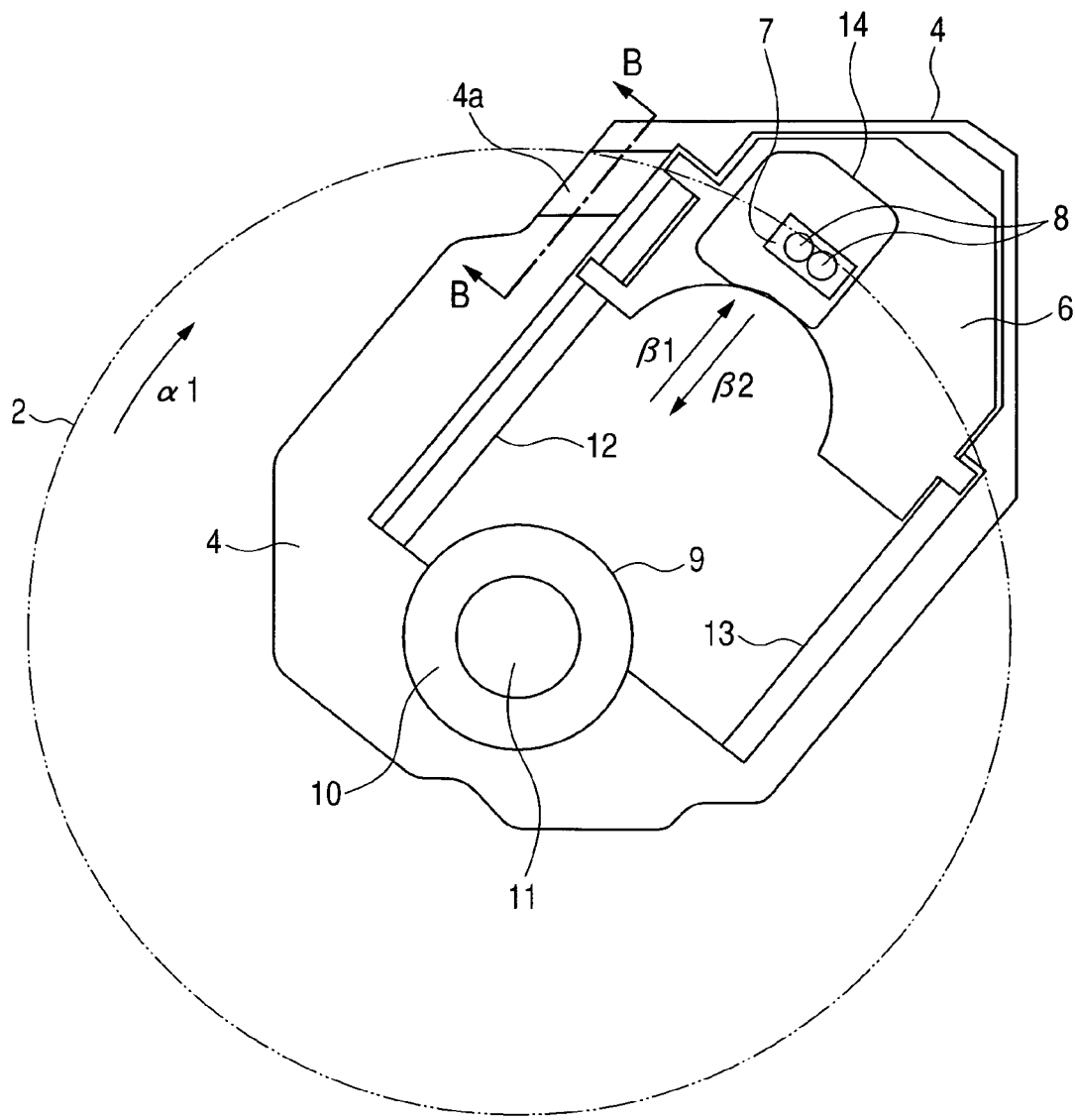
FIG. 4 is a schematic plan view of a mechanical chassis mounted in the optical disc apparatus according to the first embodiment.

FIG. 4 is a schematic plan view of a mechanical chassis which is a main mechanism.

Figure 5:
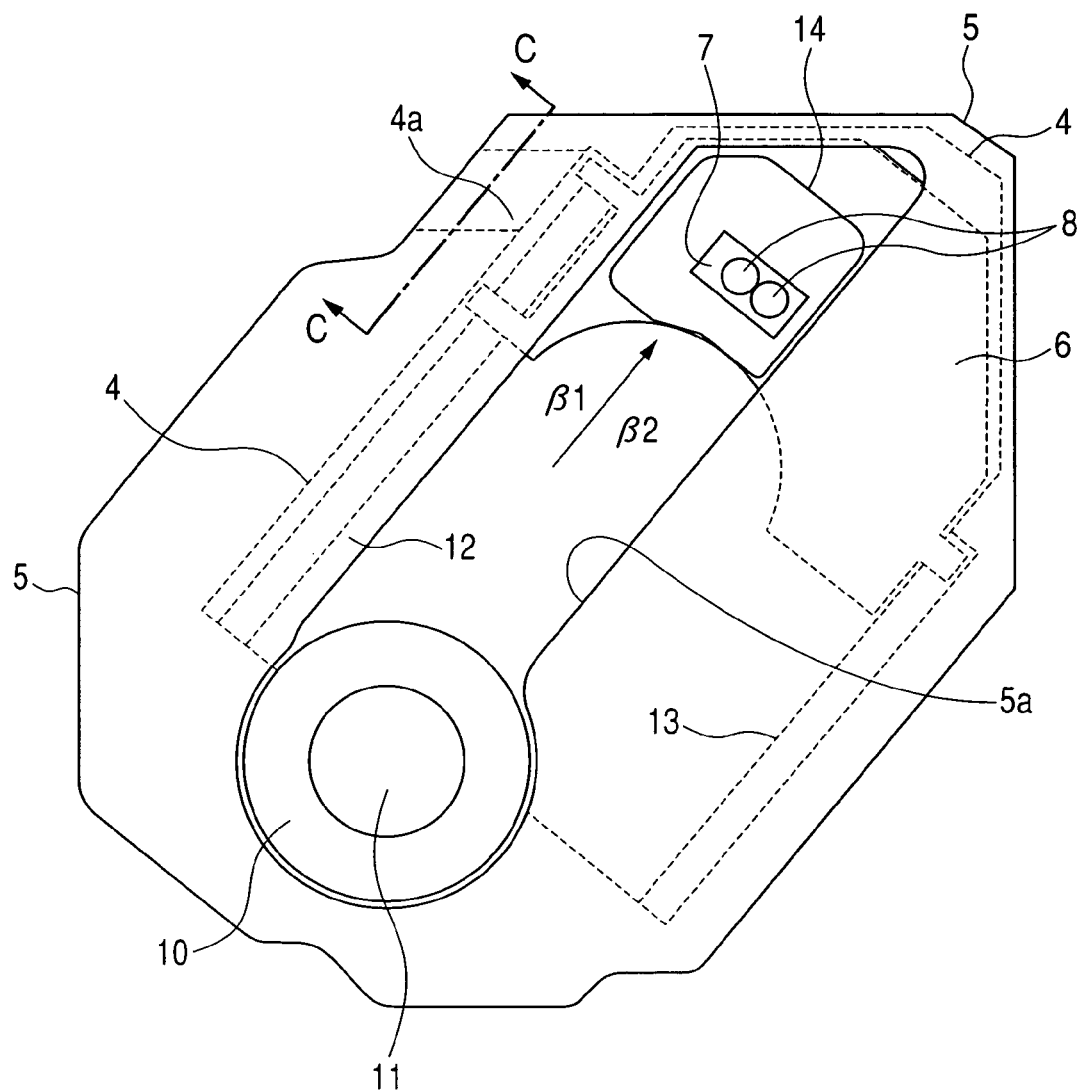
FIG. 5 is a schematic plan view illustrating the mechanical chassis with a decorative plate attached thereto which is mounted in the optical disc apparatus according to the first embodiment.

FIG. 5 is a schematic plan view illustrating the mechanical chassis with a decorative plate attached thereto which is mounted in the optical disc apparatus according to the first embodiment.

Figure 6:
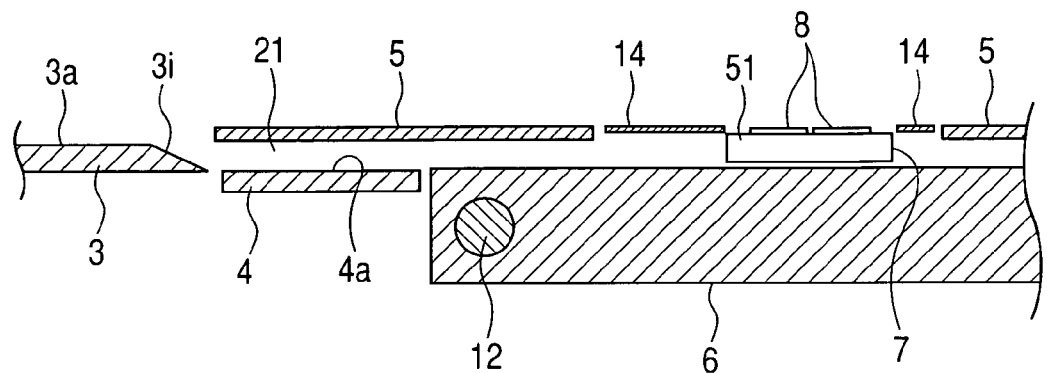
FIG. 6 is a schematic cross-section view illustrating an air-flow guiding structure of the optical disc apparatus according to the first embodiment.

FIG. 6 is a schematic cross-section view illustrating an air-flow guiding structure of the optical disc apparatus according to the first embodiment.

Figure 7:
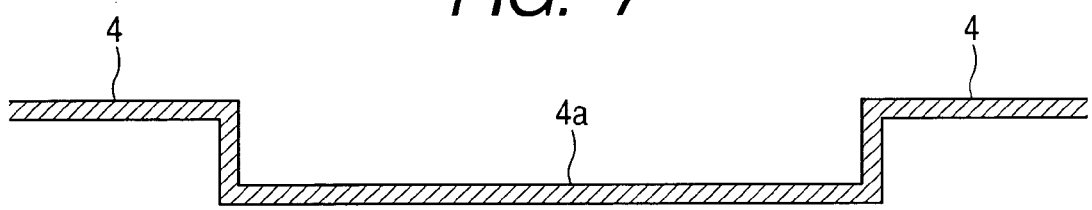
FIG. 7 is a schematic cross-section view illustrating the air-flow guiding structure of the optical disc apparatus according to the first embodiment.

FIG. 7 is a partial cross-section view illustrating the air-flow guiding structure of the optical disc apparatus according to the first embodiment.

Figure 8:
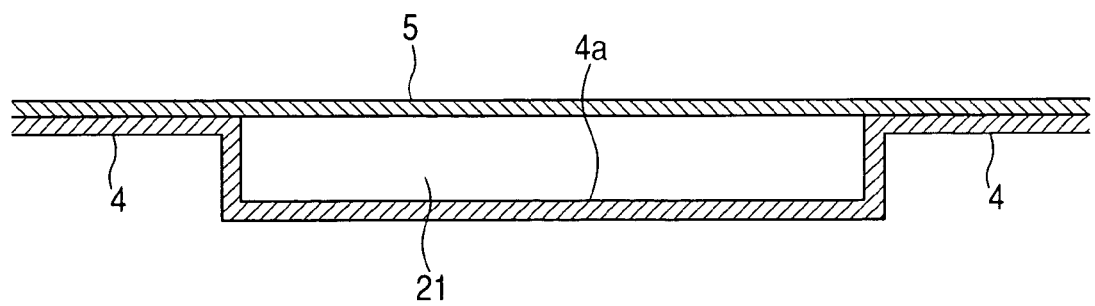
FIG. 8 is a schematic cross-section view illustrating the air-flow guiding structure of the optical disc apparatus according to the first embodiment.

FIG. 8 is a partial cross-section view illustrating the air-flow guiding structure of the optical disc apparatus according to the first embodiment.

Figure 9:
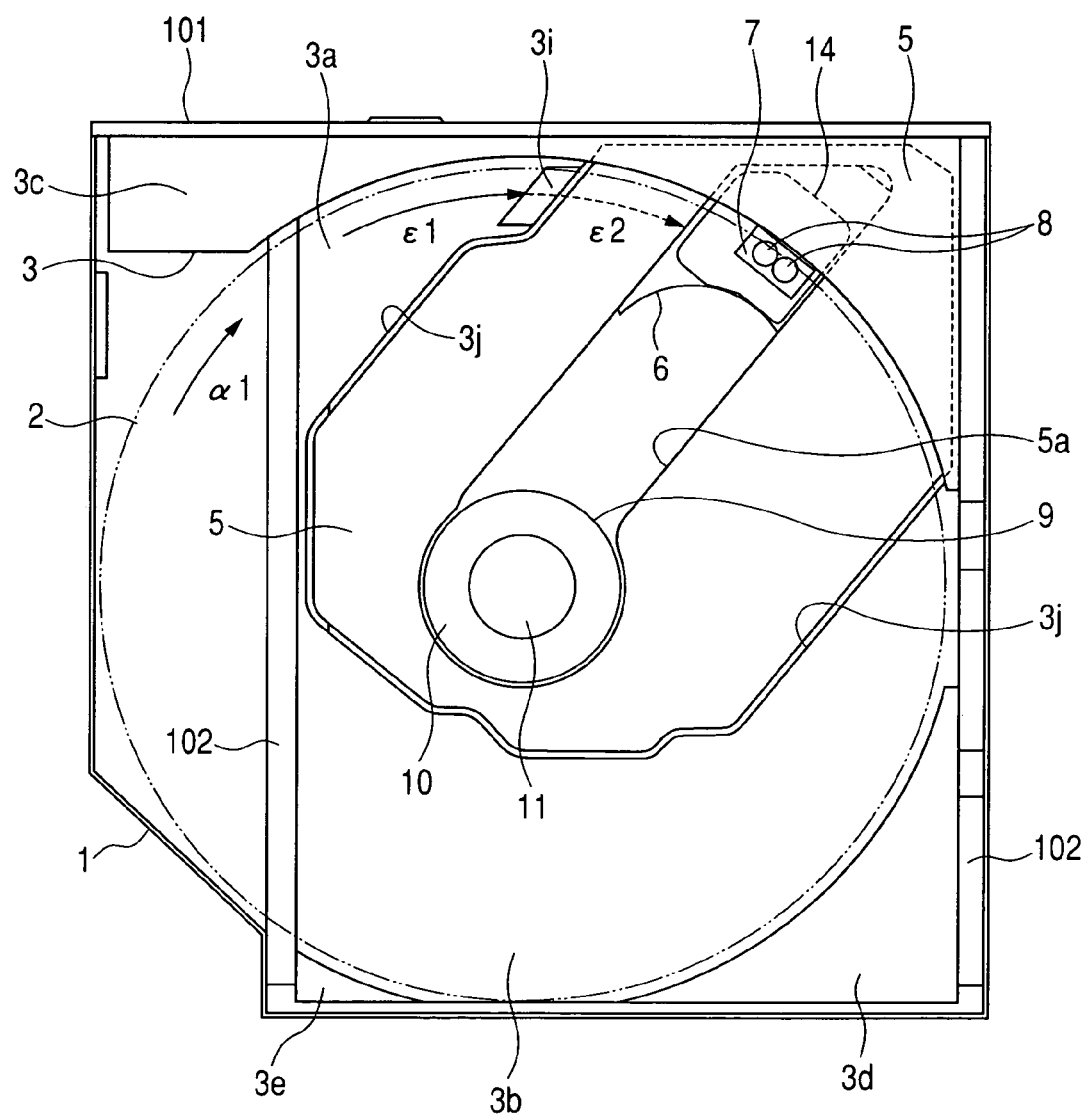
FIG. 9 is a schematic diagram illustrating the direction of air flowing in the air-flow guiding structure of the optical disc apparatus according to the first embodiment.

FIG. 9 is a schematic diagram illustrating the direction of air flowing in the air-flow guiding structure of the optical disc apparatus according to the first embodiment.

Figure 10:
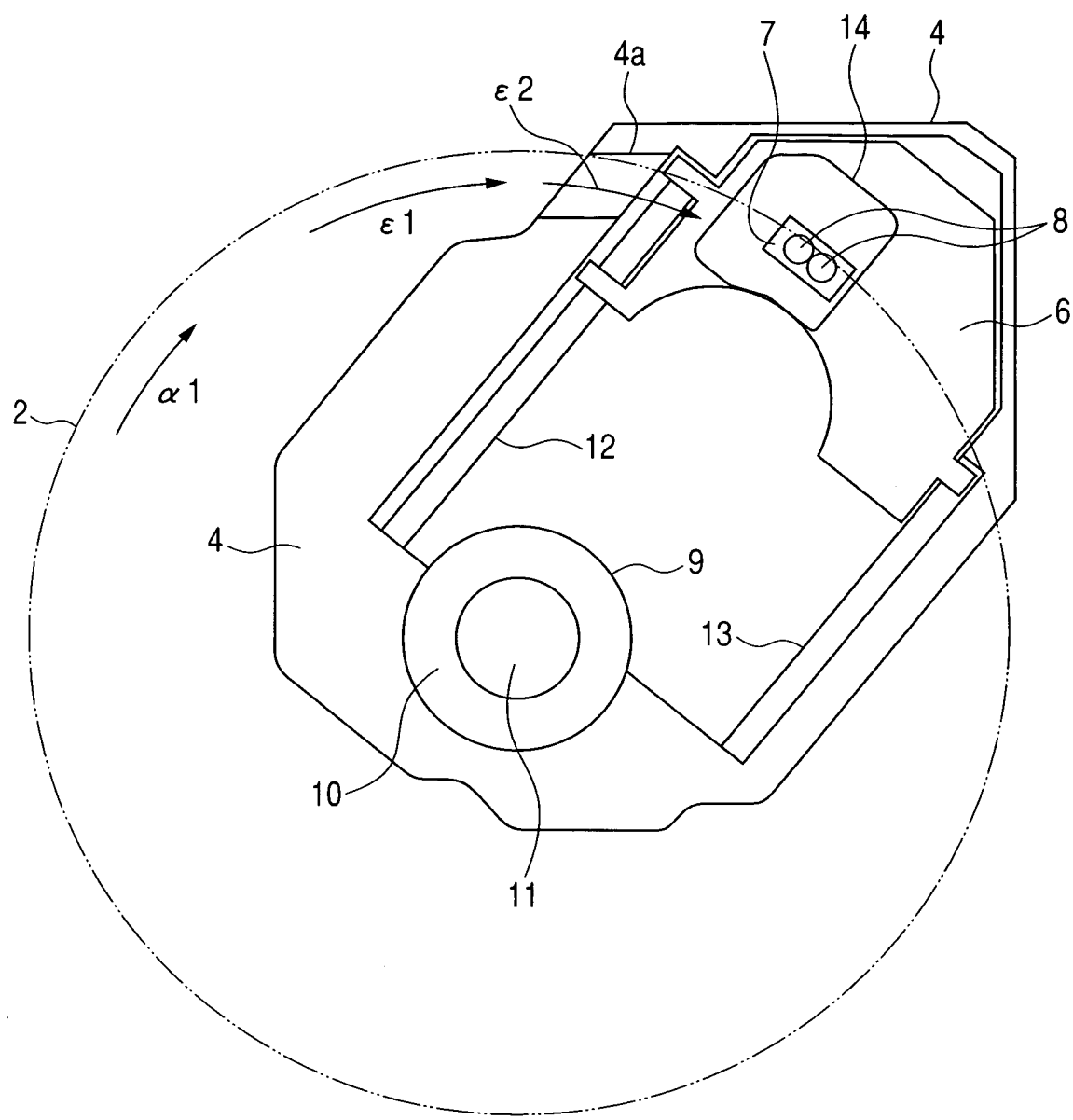
FIG. 10 is a schematic diagram illustrating the direction of air flowing in the air-flow guiding structure of the optical disc apparatus according to the first embodiment.

FIG. 10 is a schematic diagram illustrating the direction of air flowing in the air-flow guiding structure of the optical disc apparatus according to the first embodiment.

Figure 11:
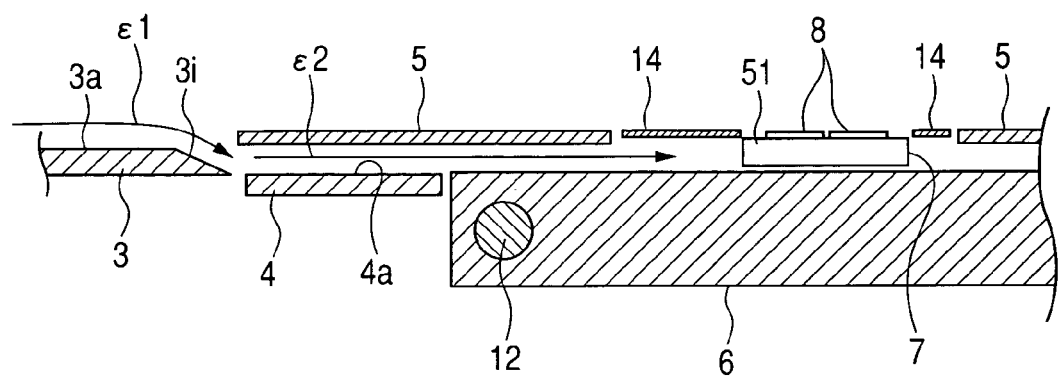
FIG. 11 is a schematic diagram illustrating the direction of air flowing in the air-flow guiding structure of the optical disc apparatus according to the first embodiment.

FIG. 11 is a schematic cross-section view illustrating the direction of air flowing in the air-flow guiding structure of the optical disc apparatus according to the first embodiment.

In an optical disc apparatus, a turntable 10 is mounted in an area defined between a bottom plate cover 1 and a top plate cover (not shown) which form part of an apparatus housing, for holding a circular-plate-shaped disc 2 which is a data recording medium. A spindle motor 9 is provided for rotating the turntable 10. An optical pickup 6 moves in a radial direction of the disc 2 which is rotated by the turntable 10 to record data to the disc 2 or to reproduce data recorded on the disc 2. A mechanical chassis 4 (shown in FIG. 5), which is a main mechanism, is mounted with a transfer mechanism (not shown) for moving the optical pickup 6 in the radial direction of the disc 2, and the like. A decorative plate 5 is a plate-shaped member which is situated between the disc 2 and the optical pickup 6 and firmly secured to the mechanical chassis 4 so as to cover the front surface of the mechanical chassis 4. The mechanical chassis 4 mounted with the decorative plate 5 is firmly secured to a disc tray 3 that is disposed so as to cover the recording surface of the disc 2 with a fixed clearance from it. The optical disc apparatus is equipped with other components, such as a control circuit board (not shown) which controls the operation of the spindle motor 9, the optical pickup 6 and the like, in the area defined between the bottom plate cover 1 and the top plate cover (not shown).

The disc tray 3 shown in FIG. 1 is moved on guides 102 which are provided in the apparatus in order to load the disc 2 into the apparatus (in the γ1 direction in FIG. 2) and eject the disc 2 from the apparatus (in the γ2 direction in FIG. 2).

FIG. 1 and FIG. 2 illustrate the disc tray 3 stored on the bottom plate cover 1.

In FIGS. 1 and 2, the chassis 4 equipped with the spindle motor 9, the optical pickup 6, the decorative plate 5 and the like (shown in FIG. 5) is fitted in an opening 3j of the disc tray 3. When the disc 2 is loaded on the disc tray 3, the disc 2 is fixed on the turntable 10 of the spindle motor 9 by a disc chuck 11. At this time, a through hole 2a drilled in the center of the disc 2 is fitted over the disc chuck 11. Then, the spindle motor 9 is rotated in order to rotate the disc 2 fixed on the turntable 10 in the α1 direction (FIG. 2). The highest rotational speed of the disc 2 reaches approximate 5500 rpm in, for example, a slim-type optical disc apparatus. The outer diameter shape of the disc 2 is represented by the chain double-dashed line in FIG. 2.

The disc tray 3 includes flat portions 3a and 3b which is to face the recording surface of the disc 2 with a fixed clearance, outer-peripheral flat portions 3c, 3d and 3e respectively having rises 3f, 3g and 3h which are shaped and disposed to make a circle which has a larger diameter than that of the disc 2 and the same center as that of the disc 2, and the opening 3j for receiving the mechanical chassis 4 (shown in FIG. 5). The disc tray 3 also includes a front bezel 101 serving as a front face (FIG. 3). The disc tray 3 is injection-molded of, for example, ABS resin (Acrylonitrile-Butadiene-Styrene copolymer resin) and/or the like which is used as a base material, by use of a mold. In FIG. 2, portions of the decorative plate 5 and the optical pickup 6 are represented by the dashed line because they are located below the disc tray 3.

While the disc 2 is rotated, the optical pickup 6 is moved from the inner periphery of the disc 2 toward the outer periphery (in the β1 direction in FIG. 2) by the transfer mechanism (not shown) in order to recode data to the recording layer of the disc 2. If the disc 2 is a double-layer disc (DVD/BD DL (Double Layer)) with recording layers of a double-layer structure, the optical pickup 6 is moved from the inner periphery of the disc 2 toward the outer periphery (in the β1 direction in FIG. 2) by the transfer mechanism to recode data to the first layer of the disc 2. After completion of the recording to the first layer, subsequently, the optical pickup 6 is moved back from the outer periphery of the disc 2 toward the inner periphery (in the β2 direction in FIG. 2) by the transfer mechanism (not shown) to recode data to the second layer.

In FIG. 5, the optical pickup 6 is supported by a main shaft 12 and a sub shaft 13 serving as guiding shafts. The shaft ends of the main and sub shafts 12, 13 are secured to the mechanical chassis 4. The mechanical chassis 4 is formed by performing bending and drawing on a sheet of rolled steel for general structure such as, for example, SS41.

The optical pickup 6 is equipped with a laser emitting unit (not shown) including a semiconductor laser device and/or the like. The laser light oscillated from the laser emitting unit travels through an optical unit (a mirror, a prism and the like) and then is focused through an objective lens 8 onto the recording surface of the disc 2, thus recording data to the disc 2. On the other hand, for reproducing data recorded on the disc 2, the light reflected from the disc 2 passes through the objective lens 8, and then through the optical unit (a mirror, a prism and the like), and then is detected by a laser receiving unit (not shown). For achieving recording to and reproducing from a BD as well as a CD/DVD, the optical pickup 6 has two objective lenses 8 provided for a CD/DVD and a BD. The optical pickup 6 is equipped with an objective-lens drive mechanism 7 that controls a position and an angle of the objective lens 8 used with respect to the recording surface of the disc 2 to adjust the focal distance to the recording surface of the disc 2.

Figure 12:
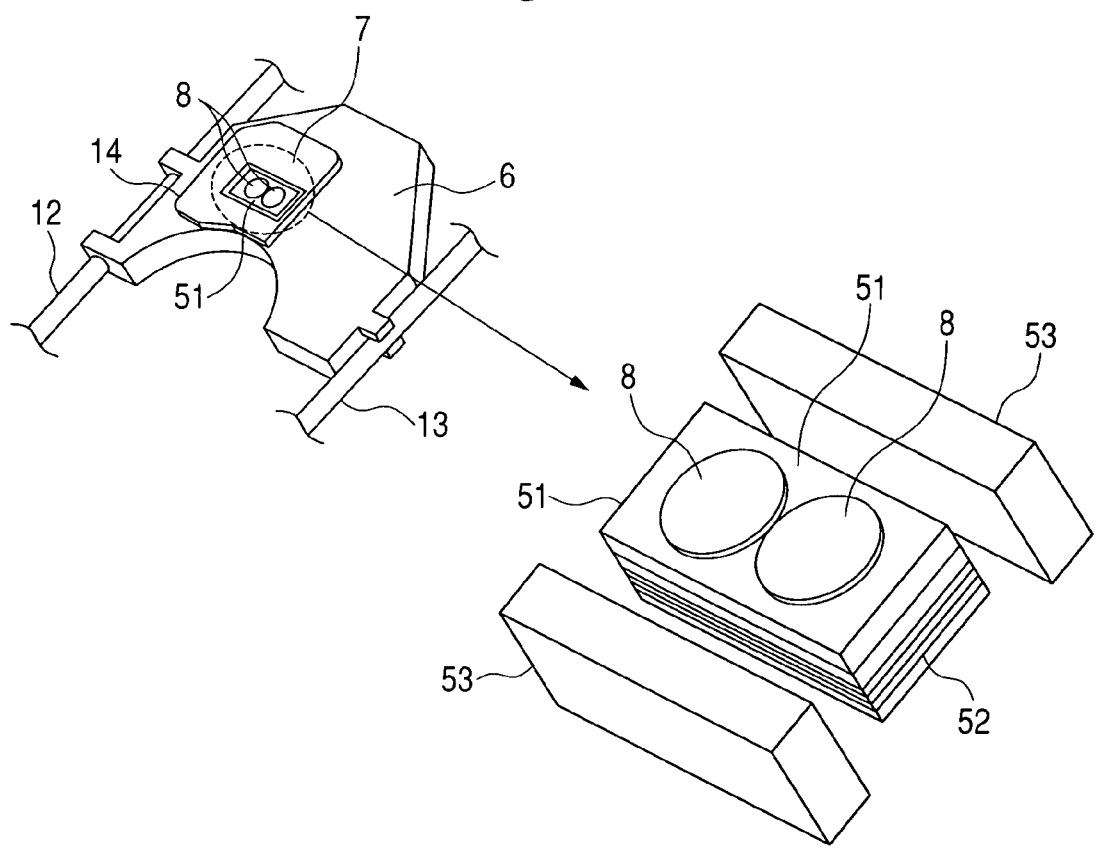
FIG. 12 is a schematic diagram illustrating the main structure of an objective-lens drive mechanism installed in an optical disc apparatus.

FIG. 12 is a perspective view of the main structure of the objective-lens drive mechanism.

In FIG. 12, for the purpose of the control of the position and the angle of the objective lens 8 with respect to the recording surface of the disc 2 when the disc 2 is rotated, the objective lenses 8 are secured to a supporting member 51 which is held in the air by a flexible material (not shown) such as a metal wire. A copper wire 52 is wound around the supporting member 51 to form a coil. In addition, two pairs of permanent magnets 53 are placed on opposite sides of the supporting member 51. As a result, the supporting member 51 is located in a magnetic field, so that an electromagnetic force is produced by the passage of electric current through the copper wire 52 wound in a coil form, thus automatically controlling the position and the angle of the supporting member 51.

The periphery of the objective-lens drive mechanism 7 is covered with a plate-shaped member 14. Along with the movement of the optical pickup 6 in the radial direction of the disc 2 (the β1, β2 direction), the objective-lens drive mechanism 7 moves within an opening 5a of the decorative plate shown in FIG. 9, so that the laser light is focused on the recording surface of the disc 2. As well as the laser emitting unit, the laser receiving unit, the optical unit and the objective-lens drive mechanism 7, a control circuit board for controlling the operation of these components is provided in a structure which is molded by techniques of, for example, magnesium die casting, zinc die casting, aluminum due casting or the like to form a housing of the optical pickup 6.

In the first embodiment as described above, a recessed portion 4a is formed in a portion of the mechanical chassis 4 facing the outer peripheral region of the recording surface of the disc 2 (FIG. 4, FIG. 5). The recessed portion 4a has a bottom located lower than the surface level of the mechanical chassis 4. Correspondingly, the disc tray 3 has an inclined portion 3i provided in a portion of the flat portion 3a which is close to the opening 3j of the disc tray 3 and faces the outer peripheral region of the recording surface of the disc 2 (FIG. 2, FIG. 3). The inclined portion 3i slopes gently down to the recessed portion 4a.

FIG. 6 shows a schematic cross-section view taken along the A-A line in FIG. 2. FIG. 7 and FIG. 8 respectively show schematic cross-section views taken along the B-B line in FIG. 4 and the C-C line in FIG. 5.

As illustrated in FIGS. 6 to 8, a space is newly created to extend from the inclined portion 3i through the recessed portion 4a to the objective-lens drive mechanism 7. The recessed portion 4a is formed by performing bending and drawing on a sheet of rolled steel for general structure such as SS41, for example. The inclined portion 3i is injection-molded of, for example, ABS resin (Acrylonitrile-Butadiene-Styrene copolymer resin) and/or the like which is used as a base material, by use of a mold. The dashed line in FIG. 5 shows the mechanical chassis 4, the main shaft 12, the sub shaft 13 and a portion of the optical pickup 6 which are located below the decorative plate 5.

Because of such a design, an air flow caused by high-speed rotations of the disc 2 (in the α1 direction) travels through the inclined portion 3i and the recessed portion 4a directly to the objective-lens drive mechanism 7 of the optical pickup 6. When the disc 2 is rotated at approximately 5500 rpm, an air-flow velocity value reaches about 30 m/s in the outer peripheral region of the disc 2.

FIG. 9, FIG. 10 and FIG. 11 schematically illustrate the direction of an air flow which is produced by high-speed rotations of the disc 2 (in the α1 direction) to travel over the inclined portion 3i (ε1 direction) and then over the recessed portion 4a (ε2 direction). In FIG. 9 the air flow traveling over the recessed portion 4a (in the ε2 direction) is represented by the dotted line because it travels below the decorative plate 5. The present inventor estimated flow velocity values of the air flow occurring in such a design by use of a computational fluid dynamic (CFD) simulation, and confirmed that the provision of the inclined portion 3i and the recessed portion 4a increased the flow velocity value around the objective-lens drive mechanism 7 approximately by a factor of four.

Since a fast air flow occurring on the outer peripheral region of the disc 2 can be smoothly guided directly to an area around the objective-lens drive mechanism 7, the air flow thus guided can effectively dissipate the heat generated by the objective-lens drive mechanism 7. Accordingly, it is possible to eliminate the disadvantage that the recording quality is degraded by an extreme temperature rise in the objective lens 8.

The first embodiment describes the example when the two CD/DVD and BD objective lenses 8 mounted in the optical pickup 6 are arranged in the rotation direction of the disc 2. Alternatively, the two CD/DVD and BD objective lenses 8 may be arranged in the radial direction of the disc 2.

Second Embodiment

Figure 13:
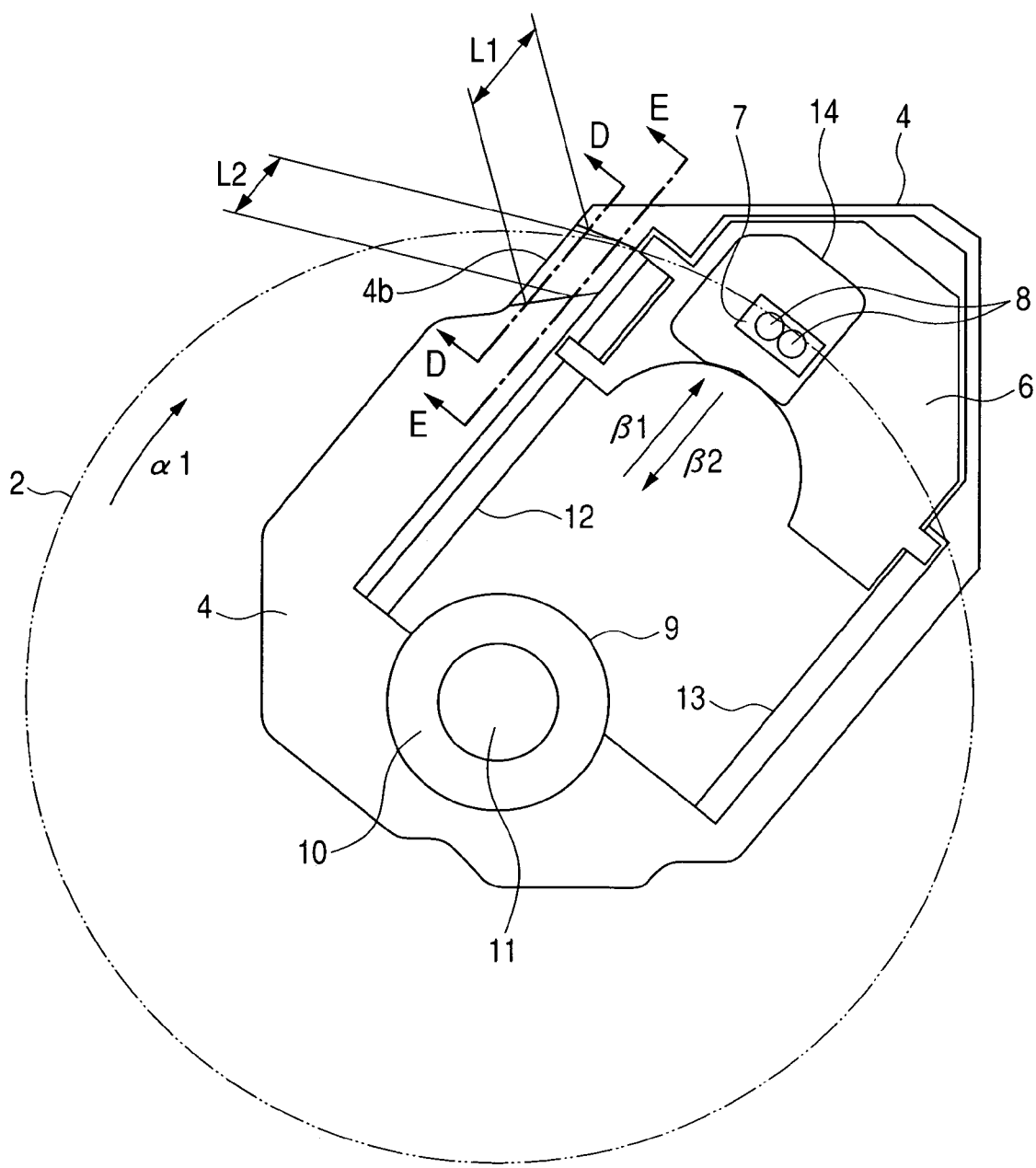
FIG. 13 is a schematic plan view of a mechanical chassis mounted in an optical disc apparatus according to a second embodiment.

FIG. 13 is a schematic plan view of a mechanical chassis 4 which is a main mechanism mounted in an optical disc apparatus according to a second embodiment of the present invention.

Figure 14:
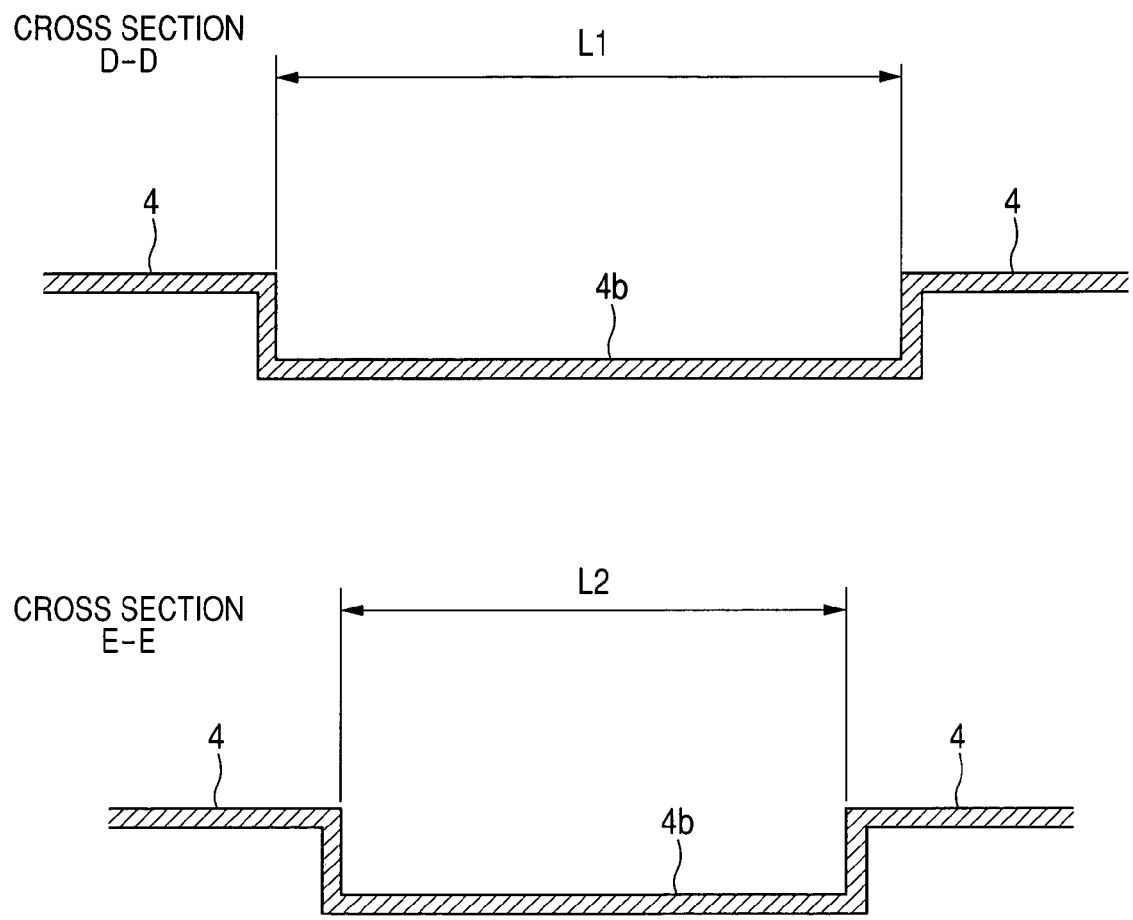
FIG. 14 is schematic cross-section views illustrating an air-flow guiding structure of the optical disc apparatus according to the second embodiment.

FIG. 14 is schematic cross-section views illustrating an air-flow guiding structure of the optical disc apparatus according to the second embodiment.

Figure 15:
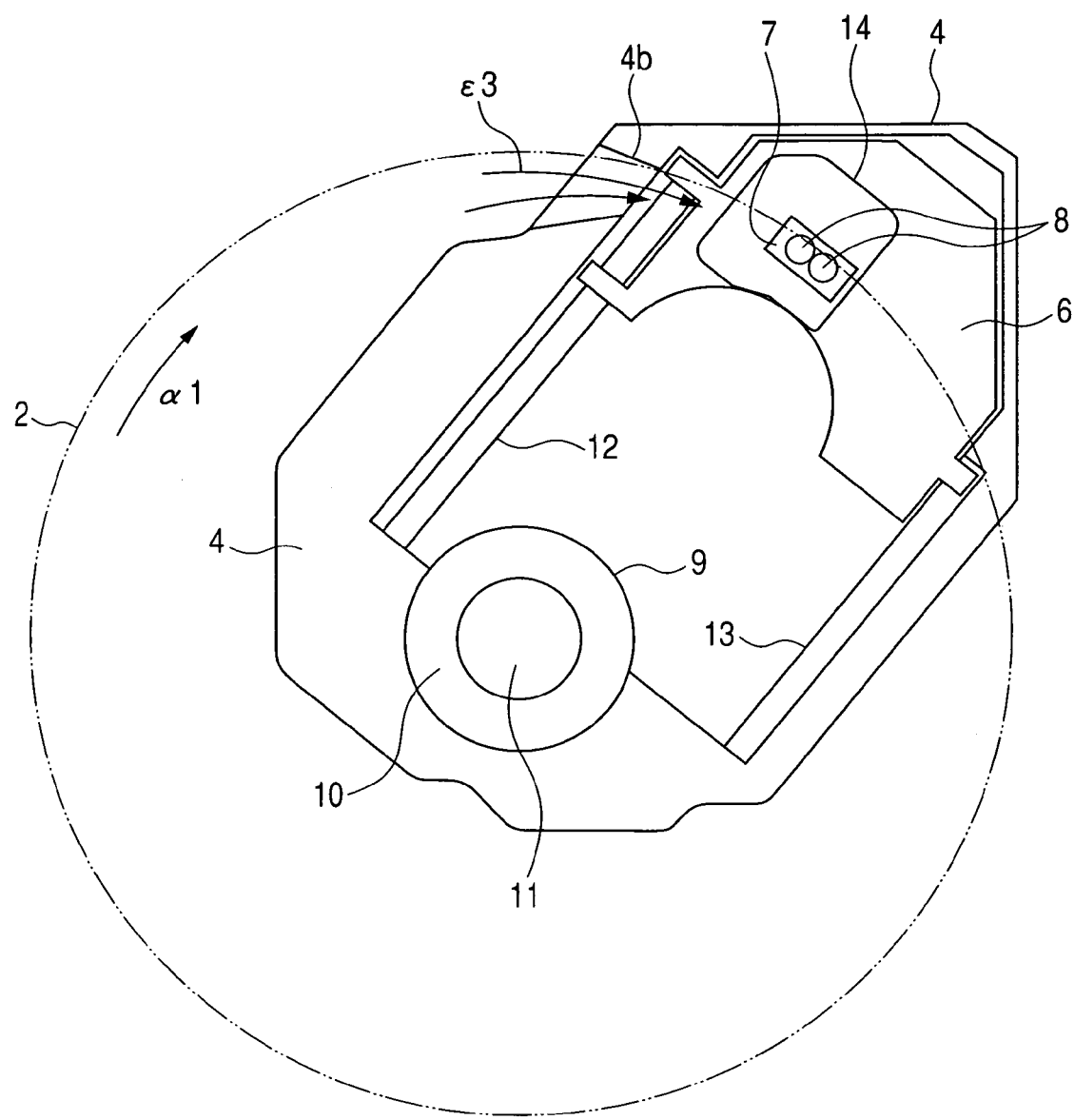
FIG. 15 is a schematic diagram illustrating the direction of air flowing in the air-flow guiding structure of the optical disc apparatus according to the second embodiment.

FIG. 15 is a schematic diagram illustrating the direction of air flowing in the air-flow guiding structure of the optical disc apparatus according to the second embodiment. In FIGS. 13 and 15, the outer diameter shape of the disc 2 is represented by the chain double-dashed lines.

The optical disc apparatus according to the second embodiment differs from that according to the first embodiment in that a recessed portion 4b is formed in a portion of the mechanical chassis 4 facing the outer peripheral region of the recording surface of the disc 2 and has a bottom located lower than the surface level of the mechanical chassis 4. In this embodiment, the recessed portion 4b has a length gradually decreasing in the rotation direction ($\alpha 1$ direction) of the disc 2. FIG. 14 illustrates schematic cross-section views taken along the D-D line and the E-E line in FIG. 13. The recessed portion has lengths L1 and L2 in the cross section D-D and the cross section E-E. The relationship between L1 and L2 is L1>L2. The recessed portion 4b is formed by performing bending and drawing on a sheet of rolled steel for general structure such as SS41, for example.

Because of such a design, an air flow produced by high-speed rotations of the disc 2 (in the $\alpha 1$ direction) travels through the inclined portion 3i (FIG. 3) and the recessed portion 4b directly to the objective-lens drive mechanism 7 of the optical pickup 6. FIG. 15 schematically shows the direction of the air flow which is produced by high-speed rotations of the disc 2 (in the $\alpha 1$ direction) to travel over the recessed portion 4b ($\epsilon 3$ direction). Since the length of the recessed portion 4b is gradually decreased in the rotation direction ($\alpha 1$ direction) of the disc 2, the air flow can travel at higher speed to the objective-lens drive mechanism 7 of the optical pickup 6.

Since a fast air flow occurring on the outer peripheral region of the disc 2 can be smoothly guided directly to an area around the objective-lens drive mechanism 7, the air flow thus guided can effectively dissipate the heat generated by the objective-lens drive mechanism 7. Accordingly, it is possible to eliminate the disadvantage that the recording quality is degraded by an extreme temperature rise in the objective lens 8.

Regarding the length of the recessed portion 4b, the relationship between the lengths L1 and L2 in the cross section D-D and the cross section E-E in FIG. 13 is not limited to L1>L2, but may be L1<L2 or L1=L2.

The second embodiment describes the example when the two CD/DVD and BD objective lenses 8 mounted in the optical pickup 6 are arranged in the rotation direction of the disc 2. Alternatively, the two CD/DVD and BD objective lenses 8 may be arranged in the radial direction of the disc 2.

In the optical disc apparatus according to the first and second embodiments, plural recessed portions, instead of a single recessed portion, may be provided in a portion of the mechanical chassis 4 facing the outer peripheral region of the recording surface of the disc 2, and have bottoms located lower than the surface level of the mechanical chassis 4.

Third Embodiment

Figure 16:
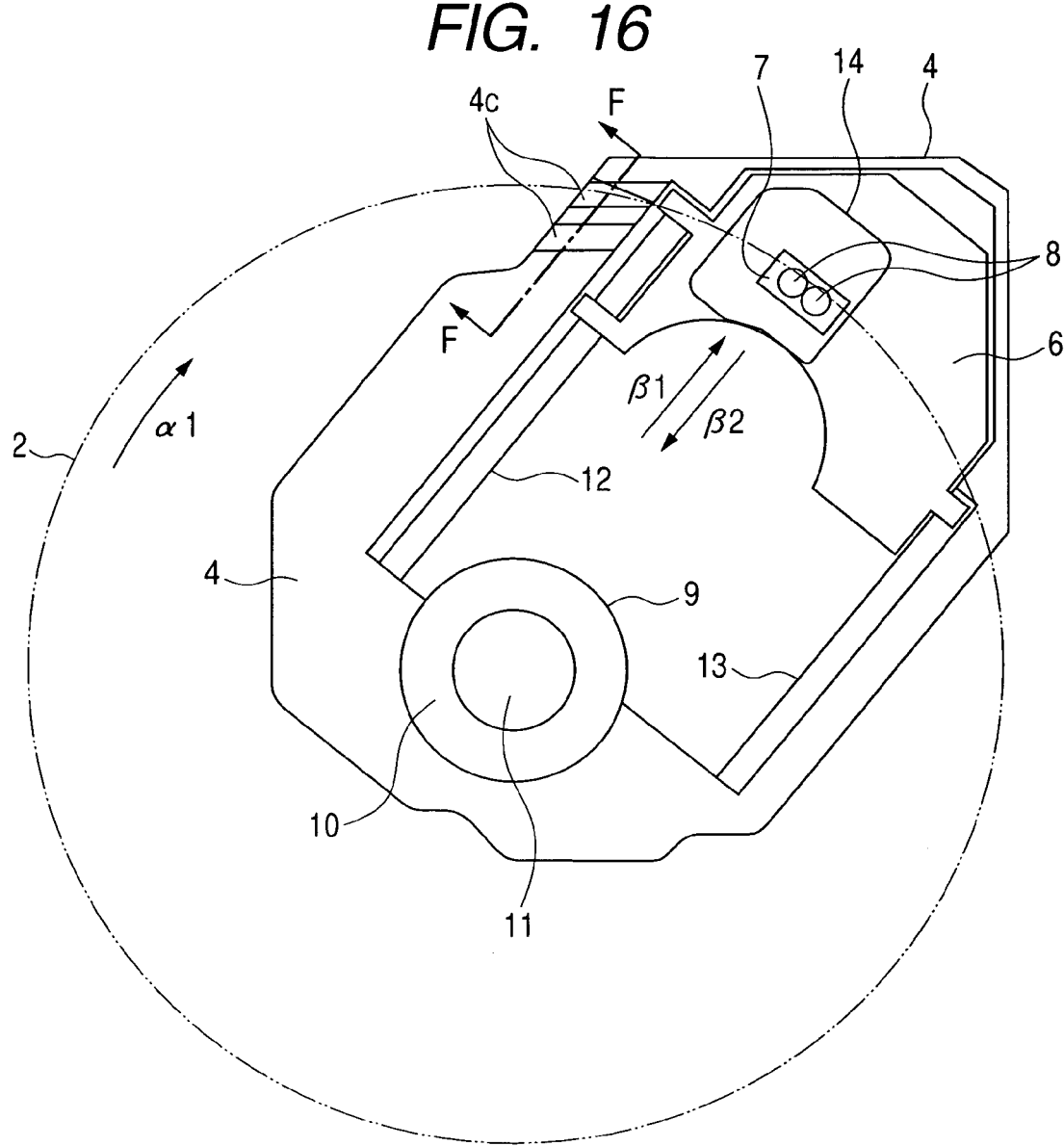
FIG. 16 is a schematic plan view of a mechanical chassis mounted in an optical disc apparatus according to a third embodiment.

FIG. 16 is a schematic plan view of a mechanical chassis 4 having two recessed portions formed therein in an optical disc apparatus according to a third embodiment.

Figure 17:
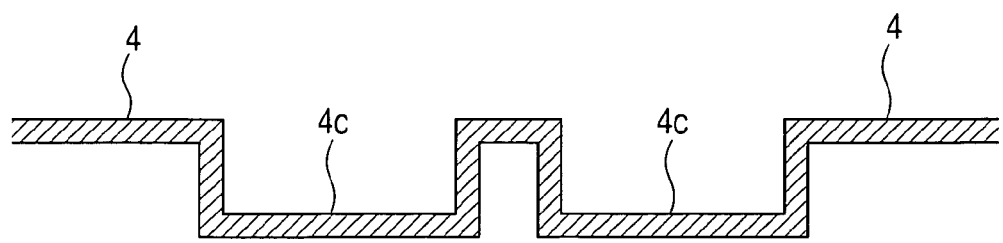
FIG. 17 is a schematic cross-section view illustrating an air-flow guiding structure of the optical disc apparatus according to the third embodiment.

FIG. 17 is a schematic cross-section view illustrating an air-flow guiding structure of the optical disc apparatus according to the third embodiment.

In the third embodiment, two recessed portions 4c are formed in a portion of the mechanical chassis 4 facing the outer peripheral region of the recording surface of the disc 2, and have bottoms located lower than the surface level of the mechanical chassis 4. The mechanical chassis 4 is shaped such that the two recessed portions 4c are formed in side by side arrangement as one piece and the recessed portions 4c are approximately bilaterally symmetrical.

According to the third embodiment, the same advantageous effects as those in the first and second embodiments can be provided.

An optical disc apparatus to which the first or second embodiment is applied is mounted in electronic equipment which may be not only a notebook PC (Personal Computer), but also a HDD (Hard Disk Drive) recorder, a DVD recorder, a vehicle-mounted computer such as a car-navigation system, a camera with an optical disc, a game machine with an optical disc, and the like.

What is claimed is:

1. An optical disc apparatus, comprising:
   an objective lens focusing laser light emitted from a laser emitting unit onto a recording surface of a disc;
   an optical pickup including a drive mechanism for driving the objective lens;
   a transfer mechanism moving the optical pickup in a radial direction of the disc;
   a mechanical chassis mounted with the transfer mechanism;
   a decorative plate that is a plate-shaped member located between the disc and the optical pickup and fixed on the mechanical chassis;
   a disc tray ejected for loading and removal of the disc; and
   an apparatus housing containing the objective lens, the optical pickup, the transfer mechanism, the mechanical chassis, the decorative plate and the disc tray,
   wherein the mechanical chassis includes at least one recess formed in an indented shape in a portion of the mechanical chassis facing an outer peripheral region of the recording surface of the disc, the at least one recess of the indented shape of the mechanical chassis having a bottom of the recess located at a position lower than a position of an upper surface level of the mechanical chassis,
   the disc tray includes an incline formed in a position close to an opening of the disc tray drilled for mounting the mechanical chassis and opposite the outer peripheral region of the recording surface of the disc, and
   the incline of the disc tray extends to the at least one recess of the mechanical chassis.

2. The optical disc apparatus according to claim 1,
wherein the at least one recess has a length decreasing gradually in a rotation direction of the disc.

3. The optical disc apparatus according to claim 1,
wherein the at least one recess includes a plurality of recesses.

4. Electronic equipped comprising the optical disc apparatus according to claim 1.

5. Electronic equipped comprising the optical disc apparatus according to claim 2.

6. Electronic equipped comprising the optical disc apparatus according to claim 3.

* * * * *